United States Patent [19]

Numaho et al.

[11] Patent Number: 4,596,987

[45] Date of Patent: Jun. 24, 1986

[54] PPI DISPLAY APPARATUS

[75] Inventors: Yoshio Numaho, Tokyo; Hiroshi Okada, Matsudo; Tetsuro Ogawa, Mitaka; Kiyoshi Arima, Tochigi, all of Japan

[73] Assignee: Tokyo Keiki Company, Ltd., Tokyo, Japan

[21] Appl. No.: 620,042

[22] Filed: Jun. 12, 1984

[51] Int. Cl.[4] ............................................. G01S 5/04
[52] U.S. Cl. ................................. 343/439; 343/16 R; 315/378
[58] Field of Search ............ 315/367, 378; 343/16 R, 343/439, 5 CD; 340/979

[56] References Cited

U.S. PATENT DOCUMENTS

| | | | |
|---|---|---|---|
| 3,462,639 | 8/1969 | French | 315/19 |
| 3,500,402 | 3/1970 | Huele et al. | 343/16 R |
| 3,761,928 | 9/1973 | Greutman | 343/16 R |
| 3,858,085 | 12/1974 | Dildy, Jr. et al. | 315/367 |
| 4,327,312 | 4/1982 | King et al. | 315/378 |

Primary Examiner—Theodore M. Blum
Assistant Examiner—David Cain
Attorney, Agent, or Firm—Wenderoth, Lind & Ponack

[57] ABSTRACT

A PPI display apparatus allows a radar image or bearing marker to be displayed on a circular CRT screen through sweeping on the basis of a plan position indicator system. In the apparatus, the generation of a radar antenna angle signal, generation of a bearing angle signal representing the angle of a bearing cursor, generation of an antenna angle signal corrected by adding a deflection angle to the antenna angle, and generation of sine and cosine signals corresponding to the antenna angle or bearing angle are all carried out through digital processing.

4 Claims, 3 Drawing Figures

PPI DISPLAY APPARATUS

BACKGROUND OF THE INVENTION

1. Field of the Invention

The present invention relates to a plan position indicator (PPI) display apparatus for displaying information of a radar, sonar, etc. on a circular screen of a cathode-ray tube (CRT) through electron beam sweep based on a polar coordinate deflection system (a PPI system).

2. Description of the Prior Art

A conventional PPI display apparatus which can display information of a radar, sonar, etc. is shown in FIG. 1, for example.

Referring to FIG. 1, an antenna angle generator 10 ordinarily uses a resolver or the like to generate a sine signal ($\sin\theta_1$) and a cosine signal ($\cos\theta_1$) proportional to an antenna angle $\theta_1$. An electronic bearing marker angle generator 12 generates a bearing marker angle signal representing the angle of a bearing marker which is displayed on the CRT screen. It ordinarily uses a resolver or sine/cosine function generating potentiometer to generate signals $\sin\theta_2$ and $\cos\theta_2$ proportional to bearing angle $\theta_2$ which is set by a manual operation signal.

The outputs from the antenna angle generator 10 and the electronic bearing marker angle generator 12 are inputted to signal selection switches 14 and 16. The signal selection switches 14 and 16 are switched under the control of an externally supplied switching control signal to selectively supply the sine and cosine signals from either the antenna angle generator 10 or the electronic bearing generator 12 to sweep signal generators 18 and 20. The sweep signal generators 18 and 20 can integrate the sine and cosine signals supplied as DC voltage signals from the signal selection switches 14 and 16 to produce sweep signals in the form of saw-toothed signals. The sweep signals are inputted to sweep current amplifiers 22 and 24. The sweep current amplifiers 22 and 24 supply amplified deflection currents to perpendicular deflection coils 26 and 28 of a CRT, whereby the image of a radar, sonar, etc. or bearing marker is displayed on the PPI display through polar coordinate deflection of an electron beam.

The sweep signal generators 18 and 20 receive externally supplied X- and Y-axis (i.e. horizontal and vertical) off-center control signals, and has an off-center function capable of shifting the sweep start point of an antenna angle sweep signal or that of a bearing marker angle sweep signal independently to a given point on the CRT screen. More specifically, off-center control signals for the antenna angle deflection signal and bearing marker angle deflection signal are supplied on a time sharing basis in a synchronous relation to a switching control signal externally supplied to the signal selection switches 14 and 16. Thus, the sweep start points for the antenna information and the bearing marker angle information can be set independently.

In the prior art PPI display system as described above, however, the sine and cosine signals representing the antenna angle $\theta_1$ and the sine and cosine signals representing the bearing marker angle $\theta_2$ are generated as analog signals from a resolver or the like. In this case, the precision of the sine and cosine signals depends on the mechanical and electrical precisions of the transmitter such as a resolver. These precisions can only be increased with an increase in cost. In addition, limitations are imposed on the precisions, so that it is difficult to increase the resolution of a target detected by the radar, sonar, etc. beyond a certain limit.

Meantime, there are various kinds of display systems in the PPI display of a radar. In one system, for instance, a head of ship called "HEAD UP" is set at the top of PPI screen for displaying information. In another system, a north bearing in a map or chart called "NORTH UP" is set at the top of PPI screen. In still another system, an intended course of ship called "COURSE UP" is set at the top of PPI screen.

In case of "NORTH UP", it is necessary to detect a deflection angle between the bearing of the ship head and the north bearing and continously correct the antenna angle of radar varing from hour to hour with the deflection angle. In case of "COURSE UP", similarly, it is necessary to detect a deflection angle between the bearing of the ship head and the preset course and correct continuously the antenna angle of radar with the deflection angle.

However, there have been problems in the aspects of precision and cost to add continuously such corrections with the deflection angle to the antenna angle which is a conventional analog signal and further to obtain the sine and cosine signals corresponding to the corrected angle.

In addition, all the signals involved are processed as analog signals, and the processing is susceptible to the influence of temperature. Electric temperature compensation is of course provided. However, since the system is used under comparatively severe conditions such as in ships, the influence of temperature cannot be perfectly compensated for, and the stability of the system is inferior.

SUMMARY OF THE INVENTION

An object of the present invention is to provide a PPI display apparatus capable of performing the PPI display in high precision by improving the precision in calculating the values of sine and cosine based on the antenna angle, bearing marker angle, etc.

Another object of the present invention is to provide a PPI display apparatus capable of accomplishing the prompt and low cost calculation of correction of the deflection angle necessary for the PPI display in various systems such as "NORTH UP" and "COURSE UP".

Still another object of the present invention is to provide a PPI display apparatus being hardly influenced by temperature and electric noise, thus being superior in stability.

The above objects, other and further objects, features and advantages of the present invention will appear more fully from the following description with reference to the accompanying drawings. It is to be understood, however, that the drawings are for purpose of illustration only and not intended as a definition of the limits of the invention.

DESCRIPTION OF THE PREFERRED EMBODIMENT

Figure 1:
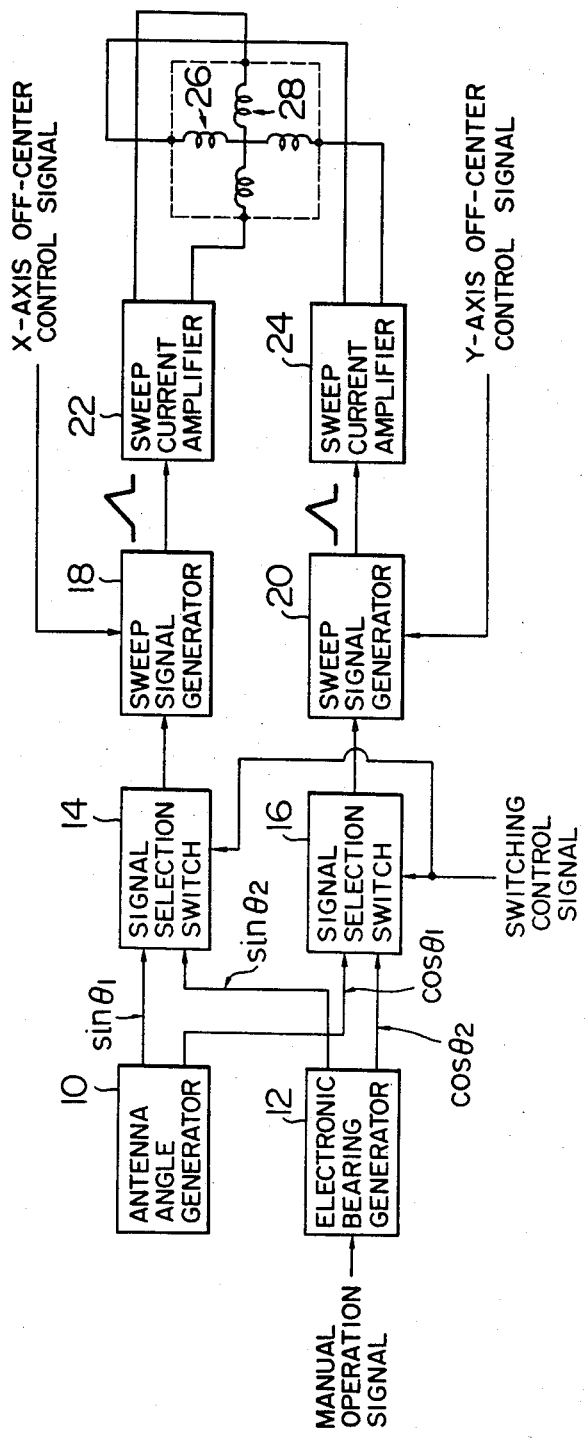
FIG. 1 is a block diagram showing a conventional apparatus.
Figure 2:
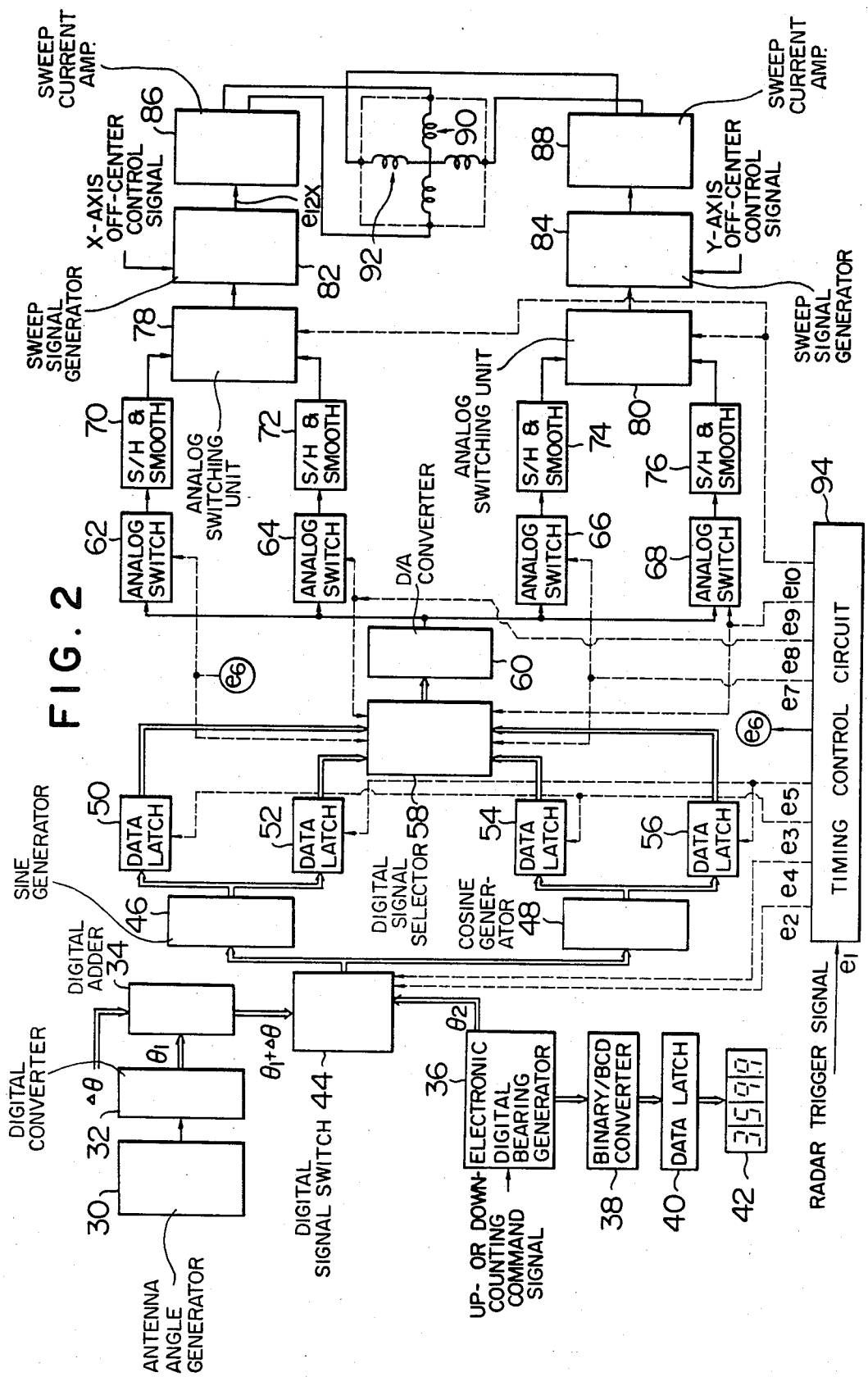
FIG. 2 is a block diagram showing an embodiment of the invention.

FIG. 2 is a block diagram showing an embodiment of the invention.

The PPI apparatus as shown comprises an antenna angle generator 30. As for the generator 30, there may be used a synchro transmitter or shaft encoder (angle encoder). A digital converter 32 converts an antenna angle signal output fed from the generator 30 as a digital signal according to the antenna angle into a binary digital angle signal $\theta_1$. As the converter 32, a synchro digital converter may be used in case where the antenna angle generator 30 is a synchro transmitter, while a pulse counter may be used in case where the antenna angle generator 30 is an incrementary shaft encoder.

Where the binary digital antenna angle signal produced from the digital converter 32 is a 12-bit signal, for example, the bit place of the individual binary bits of the angle signal and the corresponding binary-coded decimal (BCD) weight of angle are related as shown in Table 1 below.

TABLE 1

| Bit place | | BCD weight of angle |
|---|---|---|
| Most significant bit | $a_1$ | 180.0 |
| | $a_2$ | 90.0 |
| | $a_3$ | 45.0 |
| | $a_4$ | 22.5 |
| | $a_5$ | 11.25 |
| | $a_6$ | 5.625 |
| | $a_7$ | 2.8125 |
| | $a_8$ | 1.40625 |
| | $a_9$ | 0.703125 |
| | $a_{10}$ | 0.3515625 |
| | $a_{11}$ | 0.17578125 |
| Least significant bit | $a_{12}$ | 0.087890625 |

As is clear from Table 1 above, the most significant bit $a_1$ of the binary digital antenna angle signal represents an angle of 180°. The second most significant bit $a_2$ represents one half the angle, i.e. 90°. The least significant bit $a_{12}$ represents an angle weight of 0.087890625°.

The antenna angle $\theta_1$ converted into the digital angle signal which consists of such binary bits in Table 1 above, is fed to one input of a digital adder 34 which may be constructed by using required numbers (three in this embodiment) of "74LS83A" or "74LS283", etc. of TI company, for example. An antenna correction angle signal $\Delta\theta$, which similarly consists of binary 12 bits in this embodiment, is fed to another input of the digital adder 34.

The antenna correction angle signal $\Delta\theta$ is a deflection angle between the bearing of ship head and the bearing of north, for example, in case where it is desired to display a radar image by setting the north bearing called "NORTH UP" at a top of PPI. Usually it can be obtained direct from a gyrocompass.

In case where it is desired to display the image by setting the intended course of ship called "COURSE UP" at a top of PPI, the antenna correction angle signal is a deflection between the bearing of ship head and the intended course. It can be obtained by measuring the bearing of ship head from the north bearing of the gyrocompass as a base and the bearing of the intended course from the north bearing, thus attaining the difference between them.

Of course, there is no need to correct in case where the image is displayed under the bearing of ship head called "HEAD UP" set at the top of PPI. Accordingly, the correction angle $\Delta\theta=0$.

In addition, in case of display based on the "HEAD UP" only, the digital adder 34 may be omitted and the output of the digital converter 32 may be supplied direct to a digital signal selection switch 44.

As mentioned above, the sum of two input angles $(\theta_1+\Delta\theta)$ is obtained in the digital adder 34. The signal is supplied to one of inputs of the digital signal selection switch 44. To the other input of the digital signal selection switch 44 is supplied an output $\theta_2$ from an electronic digital bearing marker angle signal generator 36.

The electronic digital bearing marker angle signal generator 36 generates a digital signal representing the angle of a bearing marker displayed on a CRT screen. The generator 36 may be a binary up/down counter, which can up-count or down-count clock pulses in response to an up-counting or down-counting command signal based on the bearing marker angle setting operation and produce a digital bearing marker angle representing the desired bearing marker angle $\theta_2$ as a count of the up/down counter.

The digital data of the bearing marker angle $\theta_2$ generated by the electronic digital bearing marker angle signal generator 36 is a 12-bit binary digital data shown in Table 1 above-mentioned, for example, as well as a binary digital data in the digital converter 32 which outputs the digital signal of antenna angle.

While the output of the electronic digital bearing marker angle signal generator 36 is fed to the other input of the digital signal selection switch 44, it is also fed to a binary/BCD converter 38 for numerically displaying the bearing marker angle $\theta_2$ set by the electronic digital bearing marker angle signal generator 36. The binary/BCD converter 38 may consist of a P-ROM (programmable read-only memory), for instance, in which the digital data output of the electronic digital bearing marker angle generator 36 representing the preset bearing marker angle $\theta_2$ is used as an address signal for the P-ROM to read out a BCD code, which is stored in an address corresponding to the digital data representing the bearing marker angle, by the address data $\theta_2$ from the electronic digital bearing marker angle generator 36. The BCD code read out from the binary/BCD converter 38 representing the preset bearing marker angle $\theta_2$ is latched in a latch circuit 40 for every constant period of time. The latched data representing the preset bearing marker angle $\theta_2$ is numerically displayed on a LED numerical display 42 by driving LED display segments. The angle may be displayed in a unit of 0.1°, i.e. from 000.0° to 359.9°.

With this arrangement, the preset bearing marker angle $\theta_2$ of the bearing marker is numerically displayed as real time display on the LED numerical display 42 according to the binary digital data from the electronic digital bearing marker angle generator 36. An operator thus can set a given bearing marker angle $\theta_2$ while observing the display on the LED numerical display 42.

Either the digital data representing the antenna angle $(\theta_1+\Delta\theta)$ or the digital data representing the angle $\theta_2$ of the bearing marker, both of which being supplied to the digital signal selection switch 44, is read-out by the operation of the digital signal selection switch 44 under the control of externally supplied switching control signal and is fed to a sine generator 46 and a cosine generator 48. The sine and cosine generators 46 and 48 may consist of a P-ROM respectively, for example, as well as the binary/BCD convertor. The P-ROM uses as address data the digital data of the antenna angle $(\theta_1+\Delta\theta)$ and the digital date of the bearing marker angle $\theta_2$ supplied from the digital signal selection switch 44, reads out sine and cosine values which are preset in the P-ROM corresponding to the address data under the addressing based on each of the digital data, and outputs sine and cosine digital data respectively.

Data latch circuits 50, 52, 54 and 56 are provided for latching the data of sine and cosine values (including sign and numerical data) from the sine and cosine generators 46 and 48.

More specifically, the digital data of sine read out from the sine generator 46 is latched by the data latch circuit 50 or 52 and the numerical value is held. Similarly, the digital data of cosine read out from the cosine generator 48 is latched by the data latch circuit 54 or 56 and the numerical value is held. The outputs of the data latch circuits 50, 52, 54 and 56 are fed to a digital signal selector 58. The digital signal selector 58 selectively outputs one of these four latched inputs and supplies it to a D/A converter 60. In this embodiment, the D/A converter 60 converts the 12-bit digital data into a positive or negative analog direct voltage such as $\pm 1$ volt or $\pm 5$ volt. The output of the D/A converter 60 is fed to each of analog switch circuits 62, 64, 66 and 68. The analog switch circuits 62 to 68 are devices which can be in either of two conditions, that is, ON and OFF conditions, respectively. The device can output the positive or negative direct voltage input as it was when in the ON condition, while it can't output the inputted voltage in case of OFF condition. Thus, each of the output voltage signals from the analog switch circuits 62 to 68 are fed to corresponding S/H and smoothing circuits 70, 72, 74 and 76, respectively.

The "S/H circuit" is an abbreviated word of sample-and-hold circuit which samples the input voltage fed when the prior analog switch is on and holds the voltage value when the analog switch is off. In this embodiment, as will be clear in later description, the input signal is sampled during one fourth of one period and held during the remaining three fourth of the period. Furthermore, the smoothing circuit is a circuit for smoothing steep changes of signal voltage which would be produced at the output in the absence of the smoothing circuit and taking out an output signal which smoothly changes in time if there is a voltage difference $\Delta E = E_{N+1} - E_N$ between the prior input value $E_N$ and the present input value $E_{N+1}$. The S/H and smoothing circuits 70 to 76 include the two circuits (sample-and-hold circuit and smoothing circuit) in series, respectively.

The outputs of the S/H and smoothing circuits 70 and 72 are fed to an analog switching unit 78, while the outputs of the S/H and smoothing circuits 74 and 76 are fed to an analog switching unit 80 in the same manner. The analog switching units 78 and 80 select one of two input signals and take it out, respectively. The outputs from the analog switching units 78 and 80 are fed to sweep signal generators 82 and 84, respectively, which produce saw-toothed sweep signals by integration of the signal voltages proportional to the sine and cosine which have already been converted from digital data to analog data, smoothed and supplied. The saw-toothed sweep signals are current-amplified by sweep current amplifier 86 and 84 and then supplied as deflection currents to perpendicular deflection coils 90 and 92 of a CRT to display the information based on the antenna angle $(\theta_1+\Delta\theta)$ or the bearing marker based on the preset bearing marker angle $\theta_2$ through deflection sweep of an electron beam for the CRT screen.

X-axis (transversal) and Y-axis (vertical) off-center control signals are externally and simultaneously supplied to the sweep signal generators 82 and 84, respectively, whereby the sweep start points of antenna angle and bearing marker angle sweep signals can be independently moved to desired positions.

Next, the operation of this invention disclosed in FIG. 2 will be described with reference to the signal wave form chart of FIG. 3.

First, the analog antenna angle signal from the antenna angle signal generator 30, for instance, a synchro transmitter, is converted into a 12-bit binary angle signal $\theta_1$ every time in the digital converter 32, for instance a synchro digital converter, and thus fed to one of inputs of the digital adder 34. Since the antenna correction angle signal $\Delta\theta$ which consists of similar binary 12-bit is fed to the other input of the digital adder 34, the sum $(\theta_1+\Delta\theta)$ of both signals is outputted every time at output of the digital adder 34.

Meanwhile, according to the setting operation such that the bearing marker is set in optional direction by an operator, the count value of the up/down counter is changed by the up-counting or down-counting command signals supplied to the electronic digital bearing marker angle signal generator 36. The binary digital data of the bearing marker angle $\theta_2$ set in the electronic digital bearing marker angle signal generator 36 is supplied as an address data to the binary/BCD converter 38, in which the BCD code corresponding to the address data is read out. The BCD code is latched by the data latch circuit 40 for every constant period of time and numerically displayed on the LED numerical display 42, and thus the optional bearing marker angle is set by observing the numerical display of the LED display 42.

The angle $\theta_2$ of the bearing marker set in the electronic digital bearing marker angle signal generator 36 is fed as a binary digital data to the digital signal selection switch 44. In accordance with a control signal $e_2$ or $e_4$ supplied from a timing control circuit 94, either the digital angle signal $(\theta_1+\Delta\theta)$ from the digital adder 34 or the digital bearing marker angle signal $\theta_2$ from the electronic digital bearing marker angle generator 36 is selected and outputted from the digital signal selection switch 44.

Figure 3:
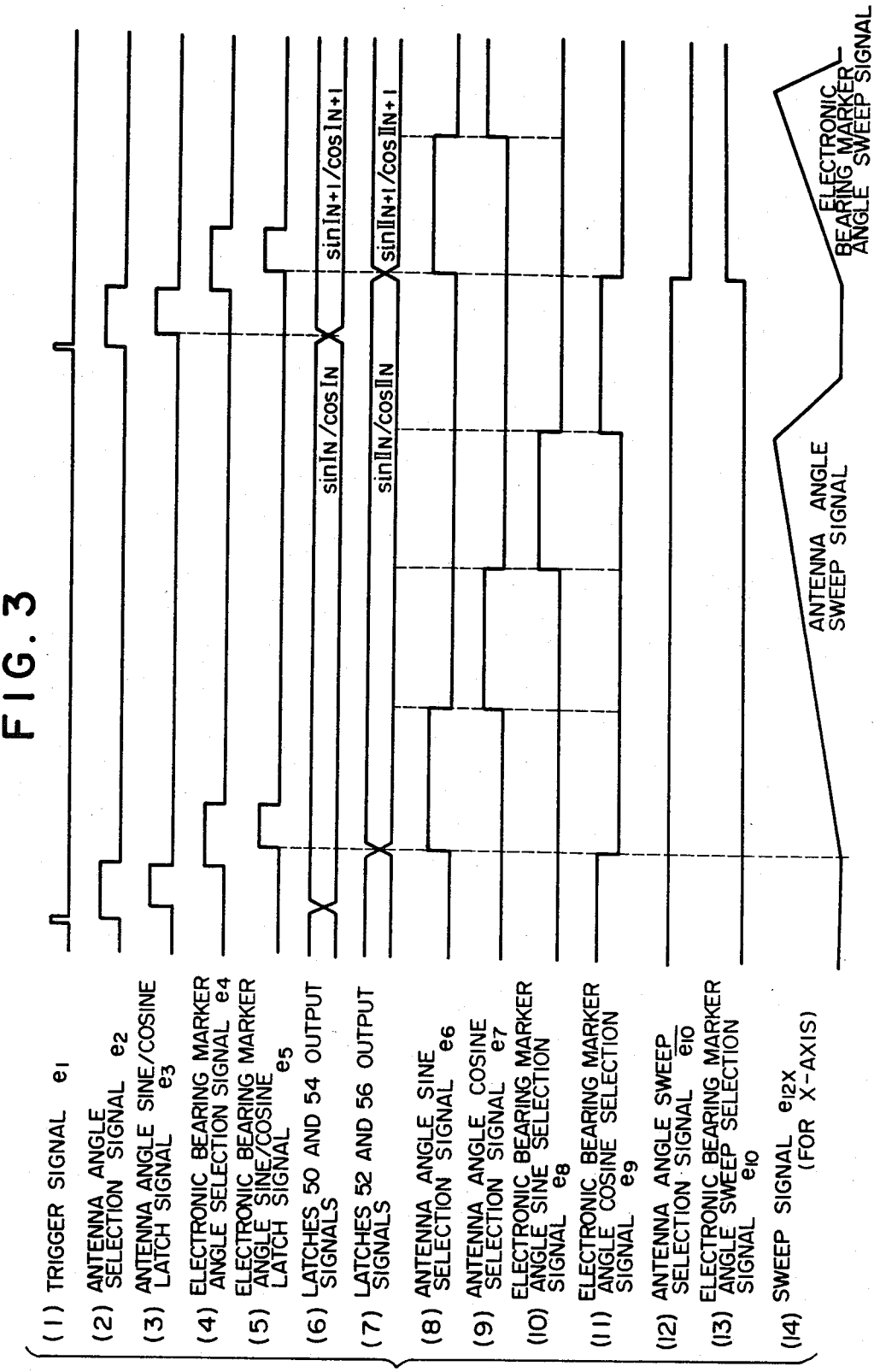
FIG. 3 is a timing chart showing wave forms of operational signal in the embodiment of FIG. 2.

In an apparatus such as radar or sonar, etc., a periodic trigger signal $e_1$ as shown in FIG. 3 (1) is generated and according to this, electric wave or ultrasonic wave is transmitted periodically.

When the trigger signal $e_1$ is fed to the timing control circuit 94, this circuit 94 generates in order the following timing signals.

First, the timing control circuits 94 generates an antenna angle selection signal $e_2$ as shown in FIG. 3 (2) and supplies it to the digital signal switch 44. Immediately the switch 44 selects and outputs the input signal $(\theta_1+\Delta\theta)$ from the digital adder 34.

Next, the timing control circuits 94 generates an antenna angle sine/cosine latch signal $e_3$ as shown in FIG. 3 (3) and supplies it to the data latch circuits 50 and 54.

Then, the antenna angle signal $(\theta_1+\Delta\theta)$ from the digital signal switch 44 is fed as an address signal to the sine generator 46 and the cosine generator 48. As a result, the sine and cosine values which correspond to the address data (i.e. the angle data) are read out from the sine and cosine generators 46 and 48 and latched by the data latch circuits 50 and 54, respectively.

Next, the timing control circuit 94 generates an electronic bearing marker angle selection signal $e_4$ as shown in FIG. 3 (4) and supplies it to the digital signal selection switch 44. Since the digital signal selection switch 44 immediately selects and outputs the input signal $\theta_2$ from the electronic digital bearing marker angle generator 36, this signal $\theta_2$ is fed as the address data to the sine and cosine generators 46 and 48, from which the sine and cosine values corresponding to the electronic bearing marker angle $\theta_2$ are read out.

Next, the timing control circuit 94 generates an electronic bearing marker angle sine/cosine latch signal $e_5$ as shown in FIG. 3 (5) and supplies it to the data latch circuits 52 and 56. Accordingly, the data latch circuits 52 and 56 latch the sine and cosine values corresponding to the electronic bearing marker angle $\theta_2$, respectively.

The two pairs of the output signals latched by the data latch circuits 50, 54 and 52, 56 in accordance with the two latch signals $e_3$ and $e_5$ from the timing control circuit 94, vary as shown in FIG. 3 (6) and (7). Namely, it is shown that the two pairs of data are latched each after the constant period of time from the trigger signal $e_1$.

The timing control circuit 94 generates in turn an antenna angle sine selection signal $e_6$ of FIG. 3 (8) and supplies it to the digital signal selector 58 and the analog switch circuit 62. As a result, the digital data from the data latch circuit 50 representing the sine value of the antenna angle $(\theta_1 + \Delta\theta)$ is selected by the digital signal selector 58, converted into the analog voltage by the D/A converter 60, and sampled-and-held by the S/H and smoothing circuit 70 through the analog switch circuit 62 turned on.

Next, the timing control circuit 94 generates an antenna cosine selection signal $e_7$ as shown in FIG. 3 (9) and supplies it to the digital signal selector 58 and the analog switch circuit 66. Through the operation as is in the case of the antenna sine selection signal $e_6$, the analog voltage representing the cosine value of the antenna angle $(\theta_1 + \Delta\theta)$ is sampled and held by the S/H and smoothing circuit 74 finally.

Next, the timing control circuit 94 generates an electronic bearing marker angle sine selection signal $e_8$ as shown in FIG. 3 (10) and supplies it to the digital signal selector 58 and the analog switch circuit 64. Then, the analog voltage representing the sine value of the electronic bearing marker angle $\theta_2$ is sampled and held by the S/H and smoothing circuit 72.

Next, the timing control circuit 94 generates an electronic bearing marker angle cosine slection signal $e_9$ as shown in FIG. 3 (11) and supplies it to the digital signal selector 58 and the analog switch circuit 68. Then, the analog voltage representing the cosine value of the electronic bearing marker angle $\theta_2$ is sampled and held.

In this way, the sine and cosine values of each of the antenna angle $\theta_1 + \Delta\theta$ and the electronic bearing marker angle $\theta_2$ is held by the S/H and smoothing circuits 70 and 74, 72 and 76, respectively, within a trigger period. This operation is periodically repeated every time the trigger signal is generated and thus the variation in every period is smoothed. Therefore, the two pairs of analog sine and cosine values corresponding to the angles $\theta_1 + \Delta\theta$ and $\theta_2$ are outputted from the S/H and smoothing circuits 70 to 76 every time.

Next, the timing control circuit 94 generates an antenna angle sweep selection signal $\overline{e_{10}}$ or an electronic bearing marker angle sweep selection signal $e_{10}$ as shown in FIG. 3 (12) or (13) and supplies it to the analog switching units 78 and 80. When the antenna angle sweep selection signal $\overline{e_{10}}$ is supplied to the analog switching units 78 and 80, the sine and cosine values from the S/H and smoothing circuits 70 and 74 corresponding to the antenna angle $\theta_1 + \Delta\theta$ are selected and supplied to the sweep signal generators 82 and 84, respectively. When the electronic bearing marker angle sweep selection signal $e_{10}$ is supplied to the analog switching units 78 and 80, the sine and cosine values from the S/H and smoothing circuits 72 and 76 corresponding to the electronic bearing marker angle $\theta_2$ are selected and supplied to the sweep signal generators 82 and 84, respectively.

Therefore, the sweep signal generators 82 and 84 produce the saw-toothed sweep signals by integration of each of the sine and cosine voltage signals and supply them to the sweep current amplifiers 86 and 88, respectively. At this time, if the X-axis and Y-axis off-center control signals are externally supplied to the sweep signal generators 82 and 84, the sweep start point can be moved from the origin at a center of CRT screen to the desired position on the CRT.

The sweep current amplifiers 86 and 88 can perform the sweep operation on the CRT by current amplifying the input sweep signal and feeding it to the perpendicular deflection coils 90 and 92, respectively. In addition, as shown in FIG. 3 (14), it is possible to display the sweep of the electronic bearing marker simultaneously with the sweep of the antenna angle on the PPI screen by stopping the antenna angle sweep signal every N times (for instance, thirty two times) to replace with the electronic bearing marker angle sweep signal. Of course, the image signal and distance marker signal, etc. can be displayed simultaneously on the PPI synchronously with the antenna angle sweep signal every time.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A PPI display apparatus for displaying information through radial sweeping of an electron beam synchronous with antenna rotational speed on a circular CRT screen in accordance with a PPI system, which comprises:

digital bearing marker angle generating means for generating a preset digital angle of bearing marker displayed on said circular CRT screen by counting pulses in response to an optional bearing marker angle setting operation of an operator;

bearing marker angle display means for converting the digital bearing marker angle signal generated by said digital bearing marker angle generating means into display code signal to numerically display on said CRT screen or a digital display;

antenna angle generating means for generating an antenna angle signal;

digital angle converting means for converting said antenna angle signal from said antenna angle generating means into a corresponding digital angle signal;

signal selection switch means for selecting the output of said digital bearing marker angle generating means and the output of said digital angle converting means in accordance with a preset timing;

sine/cosine generating means for reading out digital data representing the sine and cosine of the digital angle signal selected by said signal selection switch means from memory table storing sine and cosine digital data with said digital angle signal as address data;

data holding means for holding sine and cosine values corresponding to said antenna digital angle and digital bearing marker angle outputted from said sine/cosine generating means;

signal selecting means for selecting the output of said data holding means in accordance with a preset timing;

digital-to-analog converting means for converting the output of said signal selecting means into analog signal;

sample-and-hold circuit means for sampling and holding the output signal of said digital-to-analog converting means through an analog switch selected in accordance with a preset timing;

smoothing circuit means for smoothing the output signal of said sample-and-hold circuit means;

analog switching means for selecting the output signal of said smoothing circuit means in accordance with a preset timing;

sweep signal generating means for generating antenna angle sweep signal or bearing marker angle sweep signal proportional to the output signal of said analog switching means;

current amplifying means for proportionately current-amplifying the output signal of said sweep signal generating means to provide deflection currents to perpendicular deflection coils of said CRT.

2. A PPI display apparatus according to claim 1, wherein said digital bearing marker angle generating means comprises an up/down counter for generating a binary digital code signal by addition or subtraction of pulses in response to a bearing marker angle setting operation of an operator, and said bearing marker angle display means comprises a binary/BCD converter for converting the binary digital code signal from said up/down counter into the display code signal and a numerical display for numerically displaying said preset bearing marker angle in accordance with the display code signal converted by said binary/BCD converter.

3. A PPI display apparatus for displaying information through radial sweeping of an electron beam synchronous with antenna rotational speed on a circular CRT screen in accordance with a PPI system, which comprises:

digital bearing marker angle generating means for generating a preset digital angle of bearing marker displayed on said circular CRT screen by counting pulses in response to an optional bearing marker angle setting operation of an operator;

bearing marker angle display means for converting the digital bearing marker angle signal generated by said digital bearing marker angle generating means into display code signal to numerically display on said CRT screen or a digital display antenna angle generating means for generating an antenna angle signal;

digital angle converting means for converting said antenna angle signal from said antenna angle generating means into a corresponding digital angle signal;

digital adder means for adding the output of said digital angle converting means and necessary antenna correction angle to output a correct digital antenna angle signal;

signal selection switch means for selecting the output of said digital bearing marker angle generating means and the output of said digital adder means in accordance with a preset timing;

sine/cosine generating means for reading out digital data representing the sine and cosine of the corrected digital antenna angle signal or the digital bearing marker angle signal selected by said signal selection switch means from memory table storing sine and cosine digital data with the digital angle signal as address data;

data holding means for holding sine and cosine values corresponding to said corrected digital antenna angle and digital bearing marker angle outputted from said sine/cosine generating means;

signal selecting means for selecting the output of said data holding means in accordance with a preset timing;

digital-to-analog converting means for converting the output of said signal selecting means into analog signal;

sample-and-hold circuit means for sampling and holding the output signal of said digital-to-analog converting means through an analog switch selected in accordance with a preset timing;

smoothing circuit means for smoothing the output signal of said sample-and-hold circuit means;

analog switching means for selecting the output signal of said smoothing circuit means in accordance with a preset timing;

sweep signal generating means for generating antenna angle sweep signal or bearing marker angle sweep signal proportional to the output signal of said analog switching means;

current amplifying means for proportionately current-amplifying the output signal of said sweep signal generating means to provide deflection currents to perpendicular deflection coils of said CRT.

4. A PPI display apparatus according to claim 3, wherein said digital bearing marker angle generating means comprises an up/down counter for generating a binary digital code signal by addition or subtraction of pulses in response to a bearing marker angle setting operation of an operator, and said bearing marker angle display means comprises a binary/BCD converter for converting the binary digital code signal from said up/down counter into the display code signal and a numerical display for numerically displaying said preset bearing marker angle in accordance with the display code signal converted by said binary/BCD converter.

* * * * *